(No Model.)

I. L. OAKES.
DETACHABLE MUD GUARD FOR VEHICLES.

No. 562,192. Patented June 16, 1896.

Witnesses:
F. L. Ourand.

Inventor:
Isaac L. Oakes,
by Lamb Dagger & Co.
Attorneys.

UNITED STATES PATENT OFFICE.

ISAAC LINCOLN OAKES, OF GALION, OHIO.

DETACHABLE MUD-GUARD FOR VEHICLES.

SPECIFICATION forming part of Letters Patent No. 562,192, dated June 16, 1896.

Application filed March 31, 1896. Serial No. 585,582. (No model.)

*To all whom it may concern:*

Be it known that I, ISAAC LINCOLN OAKES, a citizen of the United States, and a resident of Galion, in the county of Crawford and State of Ohio, have invented certain new and useful Improvements in Detachable Mud-Guards for Vehicles; and I do hereby declare that the following is a full, clear, and exact description of the invention, which will enable others skilled in the art to which it appertains to make and use the same, reference being had to the accompanying drawings, which form a part of this specification.

My invention relates to detachable mud-guards for vehicles, adapted to be connected with the dashboard thereof, so as to prevent mud from being splashed upon the occupant of the vehicle in muddy weather by the horses' feet.

The object of the invention is to provide a detachable and replaceable mud guard or shield, which can be readily adjusted laterally to fit different widths of dashboards, and which can be rolled or folded into a compact form when detached, so as to occupy but little space.

This invention consists in the novel construction and combination of parts hereinafter fully described and claimed.

Figure 1:
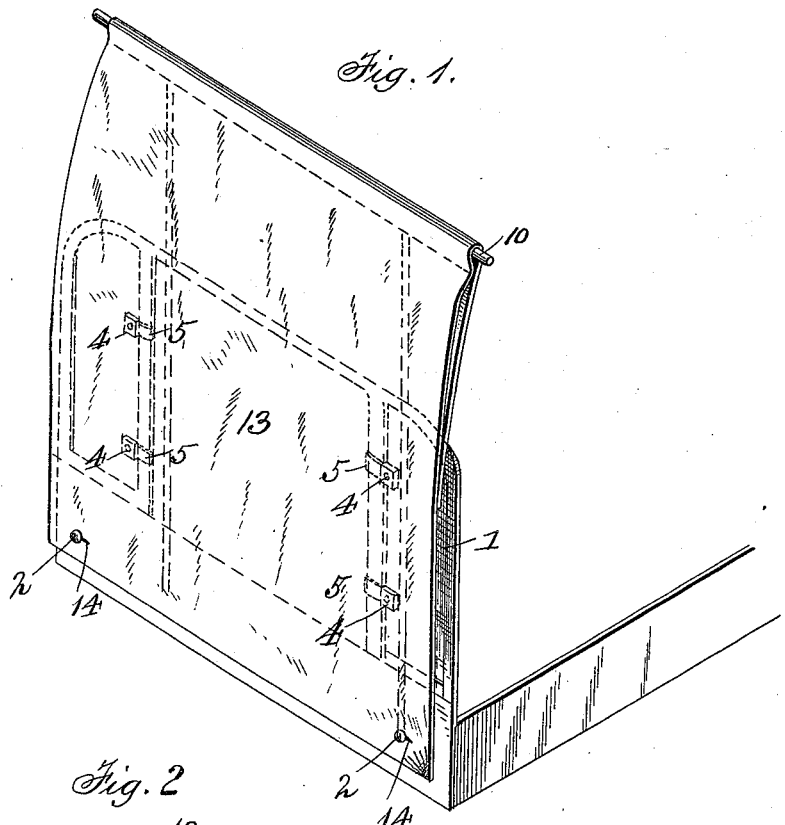
Figure 2:
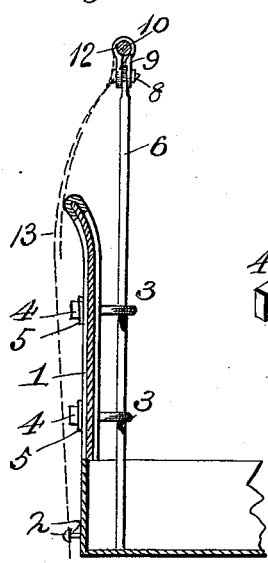
Figure 3:
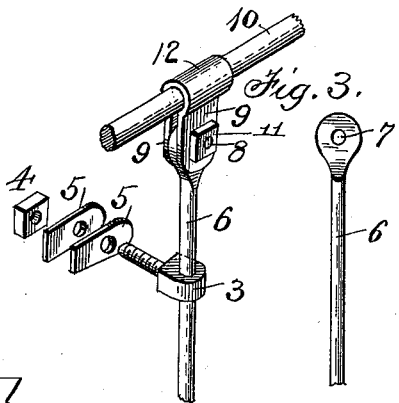

In the accompanying drawings, Figure 1 is a perspective view of a dashboard of a buggy or other vehicle, showing my improved mud shield or guard applied thereto. Fig. 2 is a longitudinal section of the same. Fig. 3 is a detail perspective view of one of the adjustable clips and the vertical and horizontal rods connected therewith.

In the said drawings, the reference-numeral 1 designates the dashboard of a buggy or other similar vehicle, which may be of any ordinary or suitable construction, provided at the lower end, near each side, with a button 2, with which engage the buttonholes of an apron, hereinafter described. Passing through alined apertures, near each end of the dashboard, are sockets or eyebolts 3, the outer ends of which engage with nuts 4, by which they are secured to the dashboard, washers 5, conforming to the shape of the dashboard, being interposed between the latter and the nuts and eyes or inner ends of the bolts or sockets. Passing through said eyes are vertical rods 6, having their upper ends formed with holes or apertures 7, through which pass bolts 8, which also pass through corresponding holes in lugs 9 of clips 12. These clips embrace a horizontal rod 10, and are adjustable laterally thereon, being held in their adjusted position by the bolts 8 and binding-nuts 11 thereon. By tightening these nuts the lugs 9 are drawn toward each other, binding the clips firmly on the rods, and when the nuts are loosened the clips may be moved laterally. The bolts also serve as pivots for the rods 6. These rods 6 extend up above the top of the dashboard, and the rod 10 has secured to it an apron 13, of rubber or oil-cloth, leather, duck, or any other material found convenient or desirable. This apron is secured to said rod intermediate its ends, and the front thereof extends down to the lower end of the dashboard, and is provided with buttonholes 14, which engage with the buttons 2, while the back or inner portion of the apron extends down to the top of the dashboard.

When in use, the vertical rods are inserted in the eyes of the bolts or sockets 3, the clips adjusted the proper distance apart and held in place on rod 10 by the binding-nuts, and the buttonholes engaged with the buttons of the dashboard. The apron extending up above the dashboard, and also in front of the same, not only shields the occupant from mud splashed by the horse, but also protects and shields the dashboard.

In fair weather, when the device is not in use, the shield or guard can be readily removed by withdrawing the rods from the eyebolts or sockets, and turned or folded inwardly on their pivots, so as to be approximately parallel with the rod 10. The apron is then rolled around the rods, so that the device will occupy but little space, and may be carried under the seat of the vehicle, or stored away in any convenient place, as found desirable.

Having thus fully described my invention, what I claim is—

1. In a mud-guard for vehicles, the combination with the vertical rods adapted to be secured to a dashboard, and the clips pivotally connected with the upper ends thereof, of the rod passing through said clips and the apron secured thereto intermediate its ends, substantially as described.

2. As an improved article a detachable folding and laterally-adjustable mud-guard for vehicles, consisting of the eyebolts and nuts, the vertical rods having openings at the upper ends, the clips, the apertured lugs formed therewith, the pivot-bolt and nut, the rod passing through said clips, and the apron secured intermediate its ends to said rod; substantially as described.

3. The combination with the dashboard of a vehicle having a button at each side, near the lower end, of the eyebolts or sockets passing through the dashboard, the nuts and washers, the vertical rods passing through said eyebolts and extending up above the dashboard, and formed with apertures at the upper ends, the clips, the apertured lugs, the pivot-bolts and nuts, the horizontal rod passing through said clips, the apron secured thereto intermediate its ends, the front of which extends down in front of the dashboard and is provided with buttonholes engaging with said buttons, and the rear portion extending to the upper end of the dashboard; substantially as described.

In testimony that I claim the foregoing as my own I have hereunto affixed my signature in presence of two witnesses.

ISAAC LINCOLN OAKES.

Witnesses:
    JESSE GRIFFITH BROWN,
    JAMES O. ROSS.